United States Patent
Chiang

(10) Patent No.: US 10,051,708 B2
(45) Date of Patent: Aug. 14, 2018

(54) INTELLIGENT LIGHTING APPARATUS

(71) Applicant: Kuo-Ching Chiang, New Taipei (TW)

(72) Inventor: Kuo-Ching Chiang, New Taipei (TW)

( * ) Notice: Subject to any disclaimer, the term of this patent is extended or adjusted under 35 U.S.C. 154(b) by 0 days.

(21) Appl. No.: 15/368,602

(22) Filed: Dec. 3, 2016

(65) Prior Publication Data

US 2017/0127483 A1 May 4, 2017

Related U.S. Application Data

(63) Continuation of application No. 14/590,987, filed on Jan. 6, 2015, now Pat. No. 9,549,446.

(51) Int. Cl.
*H05B 37/02* (2006.01)
*H05B 33/08* (2006.01)
*F21V 9/00* (2018.01)

(52) U.S. Cl.
CPC ............. *H05B 33/086* (2013.01); *F21V 9/00* (2013.01); *H05B 37/0236* (2013.01); *H05B 37/0272* (2013.01); *H05B 37/0281* (2013.01)

(58) Field of Classification Search
CPC ............ H05B 37/0272; H05B 37/0281; H05B 33/0857; H05B 33/0863
USPC .......................................................... 315/294
See application file for complete search history.

(56) References Cited

U.S. PATENT DOCUMENTS

| 9,241,384 | B2 * | 1/2016 | van de Ven | H05B 33/0857 |
| 2005/0156103 | A1 * | 7/2005 | May | G01J 3/0254 250/228 |
| 2005/0280550 | A1 * | 12/2005 | Kurian | H05B 37/0245 340/815.45 |
| 2007/0253597 | A1 * | 11/2007 | Utida | B60Q 1/085 382/104 |
| 2008/0266846 | A1 * | 10/2008 | Cheng | G01K 1/02 362/183 |
| 2011/0140864 | A1 * | 6/2011 | Bucci | G08C 17/02 340/10.42 |
| 2013/0063042 | A1 * | 3/2013 | Bora | H05B 33/0863 315/292 |
| 2013/0116015 | A1 * | 5/2013 | Lee | H04R 1/1025 455/569.1 |
| 2014/0097767 | A1 * | 4/2014 | Hsieh | H05B 37/0263 315/291 |
| 2014/0312782 | A1 * | 10/2014 | Manor | H05B 33/0803 315/155 |
| 2015/0015145 | A1 * | 1/2015 | Carrigan | H05B 37/0272 315/131 |
| 2015/0334802 | A1 * | 11/2015 | Ryu | H05B 33/0809 315/193 |
| 2015/0373796 | A1 * | 12/2015 | Bahrehmand | H05B 33/0815 315/129 |
| 2016/0088707 | A1 * | 3/2016 | Van De Sluis | H05B 37/0227 315/149 |
| 2016/0242256 | A1 * | 8/2016 | Kim | H05B 37/0272 |
| 2016/0323972 | A1 * | 11/2016 | Bora | H05B 33/0842 |

* cited by examiner

*Primary Examiner* — Don Le
(74) *Attorney, Agent, or Firm* — Chih Feng Yeh; Huntington IP Consulting Co., Ltd.

(57) ABSTRACT

An intelligent lighting apparatus includes a control unit on a base, a first color LED and a second color LED coupled with the control unit, a wireless transmission module coupled to the control unit, and a control APP disposed in a portable device. The control APP includes a time set for setting time of turning on or turning off at least first color or second color light emitting diode.

12 Claims, 1 Drawing Sheet

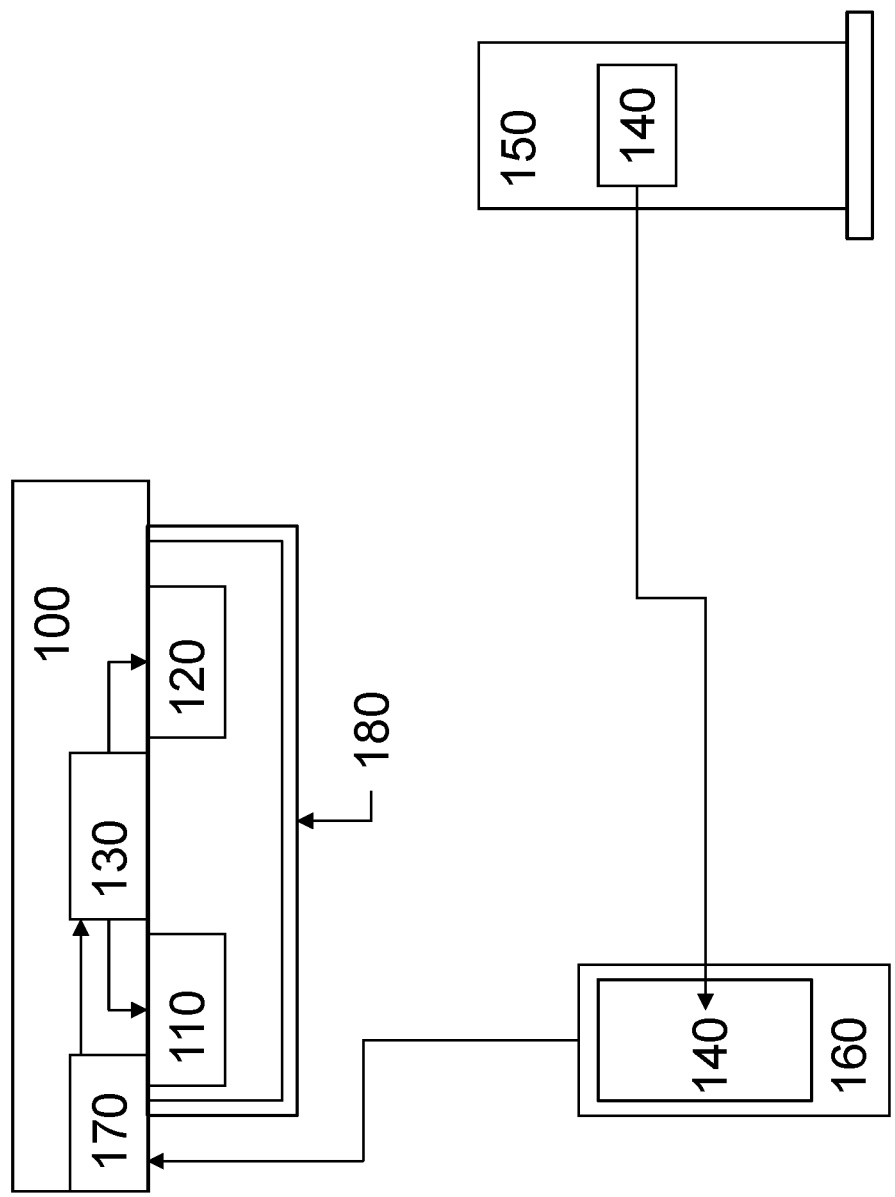

INTELLIGENT LIGHTING APPARATUS

CROSS-REFERENCE TO RELATED APPLICATION

This application is a continuation of U.S. patent application Ser. No. 14/590,987 filed Jan. 6, 2015.

TECHNICAL FIELD

The present invention relates to a lighting apparatus, and more particularly, to an intelligent lighting apparatus.

BACKGROUND OF RELATED ARTS

In early stage, indoor lighting device is fluorescent lamp or bulb. With development of technology, lighting device with light-emitting diode (LED) has become a tendency. LED has an advantage of power-saving, and its luminous efficiency is also good. However, at present, lighting fixture made by LEDs only creates a mono-chromatic light, such as white or yellow, so that user can not adjust color or intensity of the lighting fixture. Besides, switch of the lighting fixture is generally configured on the wall, and any type of light source radiates harmful blue-ray. Therefore, the present invention provides an apparatus with function which can't be found in the current light-emitting diode device.

SUMMARY

The present invention proposes an intelligent lighting apparatus capable of changing color of light.

The present invention proposes an intelligent lighting apparatus capable of adjusting brightness of light.

The present invention proposes an intelligent lighting apparatus capable of mixing light.

The present invention proposes an intelligent lighting apparatus capable of setting time of turning on and turning off LEDs.

The present invention proposes an intelligent lighting apparatus capable of filtering out blue light (ray).

The present invention proposes an intelligent lighting apparatus capable of remotely being controlled.

According to one aspect of the invention, an intelligent lighting apparatus comprises a control unit disposed on a base, at least one first color light emitting diode, at least one second color light emitting diode, a wireless transmission module coupled to the control unit and a control application configured in a portable device. A control command of the control application of the portable device is wirelessly transmitting to the wireless transmission module such that the control unit controls light emitting state of the at least one first color light emitting diode and the at least one second color light emitting diode.

According to another aspect of the invention, the control command comprises a light color selection for activating light emitting state of the at least one first color light emitting diode and the at least one second color light emitting diode.

According to one aspect of the invention, the control command comprises a light intensity selection for controlling light emitting intensity of the at least one first color light emitting diode and the at least one second color light emitting diode.

According to one aspect of the invention, the control command comprises a mixing light selection for activating the at least one first color light emitting diode and the at least one second color light emitting diode to reach effect of mixing light.

According to one aspect of the invention, the control command comprises a time set for setting time of turning on or turning off the at least one first color light emitting diode and the at least one second color light emitting diode.

According to one aspect of the invention, the intelligent lighting apparatus further comprises a light transmissive lamp shade to cover the at least one first color light emitting diode and the at least one second color light emitting diode, wherein the light transmissive lamp shade is coated with a blue light filter layer to filter out blue light.

BRIEF DESCRIPTION OF THE DRAWINGS

The components, characteristics and advantages of the present invention may be understood by the detailed descriptions of the preferred embodiments outlined in the specification and the drawings attached:

FIG. 1 illustrates a block diagram of an apparatus according to the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

FIG. 1 is a functional diagram depicting an exemplary portable device 100 including a variety of optional hardware and software components. Any components in the mobile device can communicate with any other component, although not all connections are shown, for ease of illustration. The portable device 100 can be any of a variety of computing devices (e.g., cell phone, smart phone, Personal Digital Assistant (PDA), tablet etc.) and can allow wireless two-way communications with one or more mobile communications networks, such as a cellular or satellite network.

Lighting apparatus of the present invention includes a base 100 for lighting fixtures embedded therein. The base 100 has circuits thereon, and provides with at least two different colors LEDs which includes at least one light-emitting diode, such as first color light emitting diode 110, and second color light emitting diode 120, number of LEDs depends on the requirement of applications. A control unit 130 is electrically coupled to the above the first color light emitting diode 110 and the second color light emitting diode 120, so that they can emit respectively for first color irradiation and second color irradiation or emit simultaneously to achieve effect of mixing light. The first color light can be white light, and the second color light may be yellow light. The control unit 130 is coupled to the first color irradiation and the second color irradiation to adjust its brightness to achieve fine tune effect. The above function can't be achieved by the traditional LED lighting device. The required power of these various elements or light-emitting diodes can be supplied by electric supply or batteries.

For control purpose, the present invention provides a control application (program) 140, stored in a remote server or a cloud server 150. The control application 140 can be downloaded to store in a portable device 160 according to indicating path or web site. This control program (APP) is compatible with Apple's operating system, Android's operating system or Microsoft's operating system. After downloading, the control application can be stored in a mobile phone. After installing of the control application, wireless transmission module of the portable device 160 can communicate with wireless transmission module 170, such as Bluetooth module, infrared module or WiFi module, of the lighting apparatus 100 for one-way or two-way communication. The wireless transmission module 170 is electrically coupled to the control unit 130; and the wireless communication module 170 has protocol compatible with Bluetooth, infrared or WiFi or W-CDMA, CDMA2000, CDMA2001, TD-CDMA, TD-SCDMA, UWC-136, GSM, fourth-generation (4G).

Under communication system and environment, the portable device may include at least one communication network and protocol, such as W-CDMA, CDMA2000, CDMA2001, TD-CDMA, TD-SCDMA, UWC-136, GSM, fourth-generation (4G) communication service network. The above-mentioned control application (APP) can also be downloaded including but not limited to PDA, tablet PC, laptop or smart phone, which are well known to those person skilled in the art of this field. As is generally known, the portable device 160 has a SIM card connector for bearing SIM card, which is a conventional technology. In other types of phone system, such as PHS or some CDMA, SIM card is non-essential. This illustration is used to describe and not to limit the scope of the invention. Portable terminal device or portable device comprises a wireless data transmission module. As well-known in the art, a radio frequency (RF) module/unit is coupled to an antenna system. The RF module may comprise a base band processor and the like. The antenna is connected to a wireless (radio) transceiver, which is used to receive and transmit signal. RF module may be used to perform functions of transmission and reception of signals, frequency synchronization, baseband processing and digital signal processing. SIM card hardware interface is used for receiving a SIM card. Finally, the signal is transmitted to final actuators, vocal input/output unit including a speaker and a microphone.

The above-mentioned control application (APP) comprises color control program or command, brightness control program or command, mixing light control program or command (instruction). In addition, the application (APP) further comprises timing control program or command to control the control unit 130 for further controlling the first color light emitting diode 110 and the second color light emitting diode 120 to determine when turn on and turn off. The control unit 130 includes a timer such that it can be time synchronization with the portable device 160, in order to facilitate controlling or setting the first color light-emitting diode 110 and the second color light-emitting diode 120. So you can remotely turn on or turn off the lighting apparatus, or transmit control command through the wireless module to set time of turning on or turning off. The above commands (instructions) are transmitted via wireless transmission module.

As is well-known, the lighting apparatus includes a light transmissive lamp shade 180 which can cover the base 100, the first color light emitting diode 110 and the second color light emitting diode 120. To isolate blue light harmful or reduce the blue light hazard for human eye protection, a blue light filter out layer can be applied (coated) on the light transmissive lamp shade 180 to filter out blue light, so that the radiation of light is free of blue light for eye protection.

The portable device includes a processor, a codec (coder/decoder) and an analog/digital converter, a display, an operating system (OS) and a memory, etc. The memory includes a ROM memory, a RAM memory and a non-volatile flash memory. All of the above components are coupled to the processor. In one embodiment, wireless data transmission module is using a wireless short-range (local area) network module and it is compatible with local area network or metropolitan area network, or other protocol or standard, such as Wi-Fi standard, or 802.11x (x refers a, b, g, n) standard compatible module. Short-range refers the available communication distance shorter than communication distance between mobile phones. Furthermore, the wireless LAN module is compatible with WiMAX protocol or standard.

It will be understood that the above descriptions of embodiments are given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An intelligent lighting apparatus, comprising:
   a control unit, disposed on a base;
   at least one first color light emitting diode, disposed on said base and coupled to said control unit;
   a wireless transmission module, coupled to said control unit; and
   a control application, configured in a portable device, wherein a control command of said control application of said portable device is wirelessly transmitted to said wireless transmission module such that said control unit controls light emitting state of said at least one first color light emitting diode, wherein said control application includes a turn on time or turn off time designator to designate a turn on time or a turn off time of said at least one first color light emitting diode without sensing existence of a user by outputting a turn on time or turn off time designating command by said portable device, wherein said portable device includes a vocal control module coupled to said control application to input said turn on time or turn off time designating command by vocal to turn on or turn off said at least one first color light emitting diode by said portable device remotely.

2. The apparatus as set forth in claim 1, further comprising at least one second color light emitting diode, wherein said control command comprises a light color selection for activating light emitting state of said at least one first color light emitting diode and said at least one second color light emitting diode.

3. The apparatus as set forth in claim 2, wherein said control command comprises a light intensity selection for controlling light emitting intensity of said at least one first color light emitting diode and said at least one second color light emitting diode.

4. The apparatus as set forth in claim 2, wherein said control command comprises a mixing light selection for activating said at least one first color light emitting diode and said at least one second color light emitting diode to reach effect of mixing light.

5. The apparatus as set forth in claim 2, further comprising a light transmissive lamp shade to cover said at least one first color light emitting diode and said at least one second color light emitting diode.

6. The apparatus as set forth in claim 1, wherein said control application is downloaded in said portable device from a remote terminal.

7. The apparatus as set forth in claim 1, wherein said portable device is a cell phone, a smart phone, a Personal Digital Assistant or a tablet.

8. An intelligent lighting apparatus, comprising:
a control unit, disposed on a base;
at least one first color light emitting diode, disposed on said base and coupled to said control unit;
at least one second color light emitting diode, disposed on said base and coupled to said control unit;
a wireless transmission module, coupled to said control unit;
a control application, configured in a smart phone, wherein a control command of said control application of said smart phone is wirelessly transmitted to said wireless transmission module such that said control unit controls light emitting state of said at least one first color light emitting diode and said at least one second color light emitting diode, wherein said control application includes a turn on time or turn off time designator to designate a turn on time or a turn off time of said at least one first color light emitting diode or said at least one second color light emitting diode without sensing existence of a user by outputting a turn on time or turn off time designating command by said smart phone, wherein said smart phone includes a vocal control module coupled to said control application to input said turn on time or turn off time designating command by vocal to turn on or turn off said at least one first color light emitting diode or said at least one second color light emitting diode by said portable device remotely; and
a light transmissive lamp shade to cover said at least one first color light emitting diode and said at least one second color light emitting diode.

9. The apparatus as set forth in claim 8, wherein said control command comprises a light color selection for activating light emitting state of said at least one first color light emitting diode and said at least one second color light emitting diode.

10. The apparatus as set forth in claim 8, wherein said control command comprises a light intensity selection for controlling light emitting intensity of said at least one first color light emitting diode and said at least one second color light emitting diode.

11. The apparatus as set forth in claim 8, wherein said control command comprises a mixing light selection for activating said at least one first color light emitting diode and said at least one second color light emitting diode to reach effect of mixing light.

12. The apparatus as set forth in claim 8, wherein said light transmissive lamp shade is coated with a blue light filter layer to filter out blue light.

* * * * *